A. MINOR.
STOCK SEPARATOR.
No. 182,688. Patented Sept. 26, 1876.
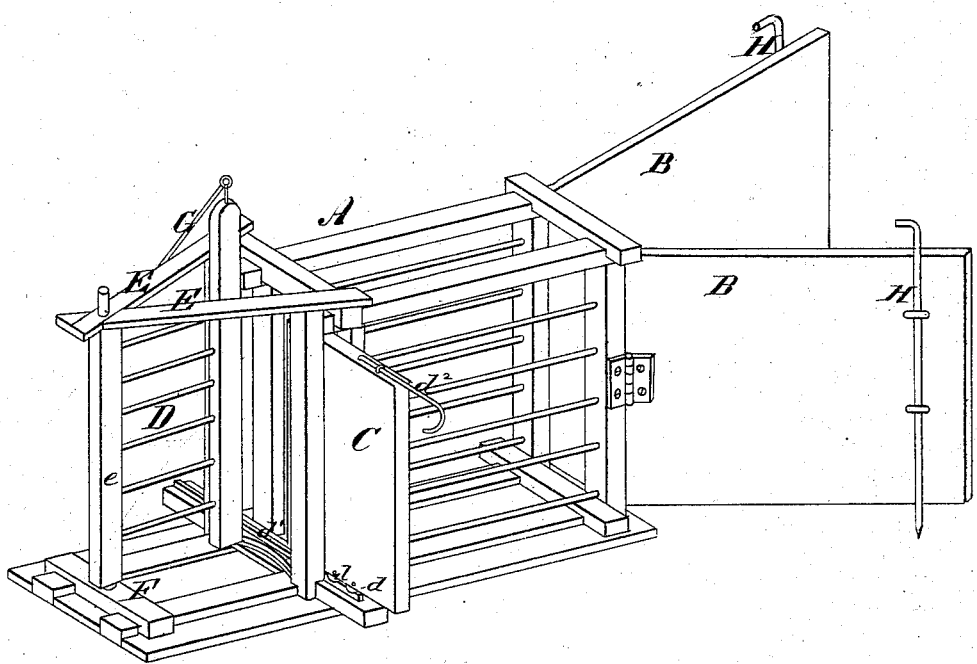
Witnesses  Inventor
Jas. B. Connolly  Abia Minor
P. J. Boland  By Connolly Bros.
  Attorneys

UNITED STATES PATENT OFFICE.

ABIA MINOR, OF JONATHAN CREEK, ILLINOIS.

IMPROVEMENT IN STOCK-SEPARATORS.

Specification forming part of Letters Patent No. 182,688, dated September 26, 1876; application filed September 1, 1876.

*To all whom it may concern:*

Be it known that I, ABIA MINOR, of the town of Jonathan Creek, in the county of Moultrie and State of Illinois, have invented a certain new and useful Live-Stock Separator; and I do hereby declare the following to be a full, clear, and exact description of the invention, such as will enable others skilled in the art to which it pertains to make and use it, reference being had to the accompanying drawing, which forms part of this specification, in which the figure is a perspective representation of my invention.

This invention has relation to live-stock separators; and consists in the novel construction, arrangement, and combination of parts, as hereinafter described, the object being chiefly to provide efficient means for the separation into their various kinds or qualities of live stock while the same are being quickly transferred from a pen or yard into adjoining receptacles, or to stock-cars.

In the accompanying drawing, A designates a passage-way, consisting of two parallel sides, between which the stock, one animal at a time, are allowed to pass. At the entrance end of this passage-way two gates, B B, one on either side, are hinged to the walls or sides of the former, and provide a guide to the stock, so that there shall be no difficulty in driving them toward the passage-way. When the separator is to be used these gates are spread apart at their ends, as shown, so as to form a converging entrance. At the outer end of the passage-way a cut-off gate, C, is arranged to close the exit-opening when desired. This gate may be provided with rollers $d$, to travel on a rail, $d^1$, and with a bolt, $d^2$, to secure it when closed. D is the separating-gate, supported between the bars E projecting from the top of the passage-way frame and the base F, and having its outer post $e$ pivoted to said bars and base, on a line with the center of the exit, so that the gate shall swing laterally across the exit of the passage-way, its inner end extending upward between said bars E. The gate D is operated by a rod, G, or other suitable device, and is swung from side to side alternately, according to the requirements of the purposed division of stock, the portion passing on one side of the gate going in a different direction from those passing on the other side, the gate in each position forming a continuation of the passage-way. H are pins attached to the entrance-gates, to be inserted in the ground for holding gates in place.

Having described my invention, I claim as new, and desire to secure by Letters Patent—

1. A live-stock separator having a narrow passage-way for the transfer of the stock, and at the exit end of said passage-way a separating-gate to divide and direct the animals, substantially as described.

2. The combination, with a live-stock separator, of the converging entrance-gates, substantially as described.

3. The combination of a cut-off gate with a live-stock separator.

4. The combination of the passage-way frame A and separating-gate D, substantially as described.

In testimony that I claim the foregoing I have hereunto set my hand this 8th day of August, 1876.

ABIA MINOR.

Witnesses:
A. N. SMYSER,
B. S. EVERMAN.